(12) United States Patent
Shimotani et al.

(10) Patent No.: US 9,083,962 B2
(45) Date of Patent: Jul. 14, 2015

(54) 3DIMENSION STEREOSCOPIC DISPLAY DEVICE

(75) Inventors: Mitsuo Shimotani, Tokyo (JP); Makoto Mikuriya, Tokyo (JP); Takeo Sakairi, Tokyo (JP); Eriko Toma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 466 days.

(21) Appl. No.: 13/701,395

(22) PCT Filed: Oct. 20, 2010

(86) PCT No.: PCT/JP2010/006219
§ 371 (c)(1),
(2), (4) Date: Nov. 30, 2012

(87) PCT Pub. No.: WO2012/053032
PCT Pub. Date: Apr. 26, 2012

(65) Prior Publication Data
US 2013/0070065 A1    Mar. 21, 2013

(51) Int. Cl.
*H04N 7/18* (2006.01)
*H04N 13/04* (2006.01)
*G01C 21/36* (2006.01)

(52) U.S. Cl.
CPC ............. *H04N 13/04* (2013.01); *G01C 21/365* (2013.01); *H04N 13/0452* (2013.01); *H04N 13/0497* (2013.01)

(58) Field of Classification Search
USPC ........ 348/42, 142, 333.01; 345/419; 715/768, 715/776; 701/36
See application file for complete search history.

(56) References Cited

U.S. PATENT DOCUMENTS

| | | | |
|---|---|---|---|
| 2006/0050016 A1 | 3/2006 | Tomisawa et al. | |
| 2008/0030428 A1 | 2/2008 | Tomisawa et al. | |
| 2008/0161997 A1 | 7/2008 | Wengelnik et al. | |
| 2010/0026871 A1* | 2/2010 | Yonaha et al. | 348/333.01 |
| 2010/0188503 A1* | 7/2010 | Tsai et al. | 348/142 |

FOREIGN PATENT DOCUMENTS

| | | | |
|---|---|---|---|
| JP | 5-147456 A | 6/1993 | |
| JP | 9-113839 A | 5/1997 | |
| JP | 2003-280812 A | 10/2003 | |
| JP | 2004-280496 A | 10/2004 | |
| JP | 2005-175566 A | 6/2005 | |
| JP | 2006-293878 A | 10/2006 | |
| JP | 2008-40596 A | 2/2008 | |
| JP | 2008-538037 A | 10/2008 | |
| WO | WO 2004/038486 A1 | 5/2004 | |
| WO | WO 2006/035816 A1 | 4/2006 | |

* cited by examiner

*Primary Examiner* — Thai Tran
*Assistant Examiner* — Mishawn Dunn
(74) *Attorney, Agent, or Firm* — Birch, Stewart, Kolasch & Birch, LLP

(57) ABSTRACT

Disclosed is a 3Dimension stereoscopic display device including a video image playback device 5 for playing back a right-eye image or video image and a left-eye image or video image for three-dimensional stereoscopic display of an inputted image or video image, a stereoscopic display monitor 6 for producing a three-dimensional stereoscopic display of the right-eye and left-eye images or video images, and a screen composition processing unit 4 for generating the right-eye and left-eye images or video images in which a virtual display surface P for three-dimensional stereoscopic display of the inputted image or video image is moved with respect to the screen Q of the stereoscopic display monitor 6 according to whether a user operation using an operation input unit 18 is being performed to output the right-eye and left-eye images or video images to the video image playback device 5.

12 Claims, 15 Drawing Sheets

3DIMENSION STEREOSCOPIC DISPLAY DEVICE

FIELD OF THE INVENTION

The present invention relates to a 3Dimension stereoscopic display device which displays a 3Dimension stereoscopic image or a 3Dimension stereoscopic movie.

BACKGROUND OF THE INVENTION

A conventional stereoscopic display device disclosed by patent reference 1 provides a three-dimensional stereoscopic image mainly intended for home use. Because this stereoscopic display device enables the user to watch a three-dimensional stereoscopic video image without wearing stereoscopic vision glasses, the stereoscopic display device offers high convenience to the user. For example, the stereoscopic display device is suitable for use as a content playback device for the front seat and an RSE (Rear Seat Entertainment) display for rear seats.

RELATED ART DOCUMENT

Patent Reference

Patent reference 1: Japanese Unexamined Patent Application Publication NO. 2005-175566

SUMMARY OF THE INVENTION

However, in the case of applying a conventional technology typified by the technology disclosed in patent reference 1 to a display device that displays in-vehicle information for driver or a meter panel, t necessary to take into consideration convenience for HMI (Human Machine Interface) purposes. For example, a display of information or icons or the like using a three-dimensional stereoscopic image or three-dimensional stereoscopic video image without taking into consideration the driver's state and conditions impairs the usability of the display device using this display screen instead.

The present invention is made in order to solve the above-mentioned problem, and it is therefore an object of the present invention to provide a 3Dimension stereoscopic display device which changes a virtual, display method of virtually displaying an operation target, such as a display surface or an icon, according to a user operation or state, thereby being able to provide an HMI with a three-dimensional stereoscopic display which enables the user to perform an operation matching the user's intuition.

In accordance with the present invention, there is provided a 3Dimension stereoscopic display device including: an operation input unit for accepting a user operation; a user operation detection unit for detecting a behavior of going to perform a user operation on said operation input unit; a playback processing unit for playing back a right-eye image or video image and a left-eye image or video image for three-dimensional stereoscopic display of an inputted image or video image which is a display object; a stereoscopic display monitor unit for producing a three-dimensional stereoscopic display of the right-eye image or video image and the left-eye image or video image for three-dimensional stereoscopic display of the image or video image which is the display object, the right-eye and left-eye images or video images being played back by the playback processing unit; and a screen composition processing unit for generating the right-eye image or video image and the left-eye image or video image for three-dimensional stereoscopic display in which a virtual display surface for three-dimensional stereoscopic display of the image or video image which is the display object is moved with respect to a screen of the stereoscopic display monitor unit according to whether a user operation using the operation input unit is being performed or whether the user operation detection unit detects the behavior to output the right-eye image or video image and the left-eye image or video image generated thereby to the playback processing unit, in which when no user operation using said operation input unit is being performed, the 3Dimension stereoscopic display device moves the virtual display surface for three-dimensional stereoscopic display of the image or video image which is the display object backward with respect to the screen of the stereoscopic display monitor unit when viewed from a user's position, whereas when a user operation using the operation input unit is being performed or when the user operation detection unit detects a behavior of going to perform a user operation on the operation input unit, the screen composition processing unit moves the virtual display surface for three-dimensional stereoscopic display closer to a user, and, when the user operation is completed, moves the virtual display surface for three-dimensional stereoscopic display to its original position backward with respect to the screen of the stereoscopic display monitor unit.

In accordance with the present invention, there is provided an advantage of being able to provide an HMI with a three-dimensional stereoscopic display which enables a user to perform an operation matching the user's intuition.

EMBODIMENTS OF THE INVENTION

Hereafter, in order to explain this invention in greater detail, the preferred embodiments of the present invention will be described with reference to the accompanying drawings.

Embodiment 1

Figure 1:
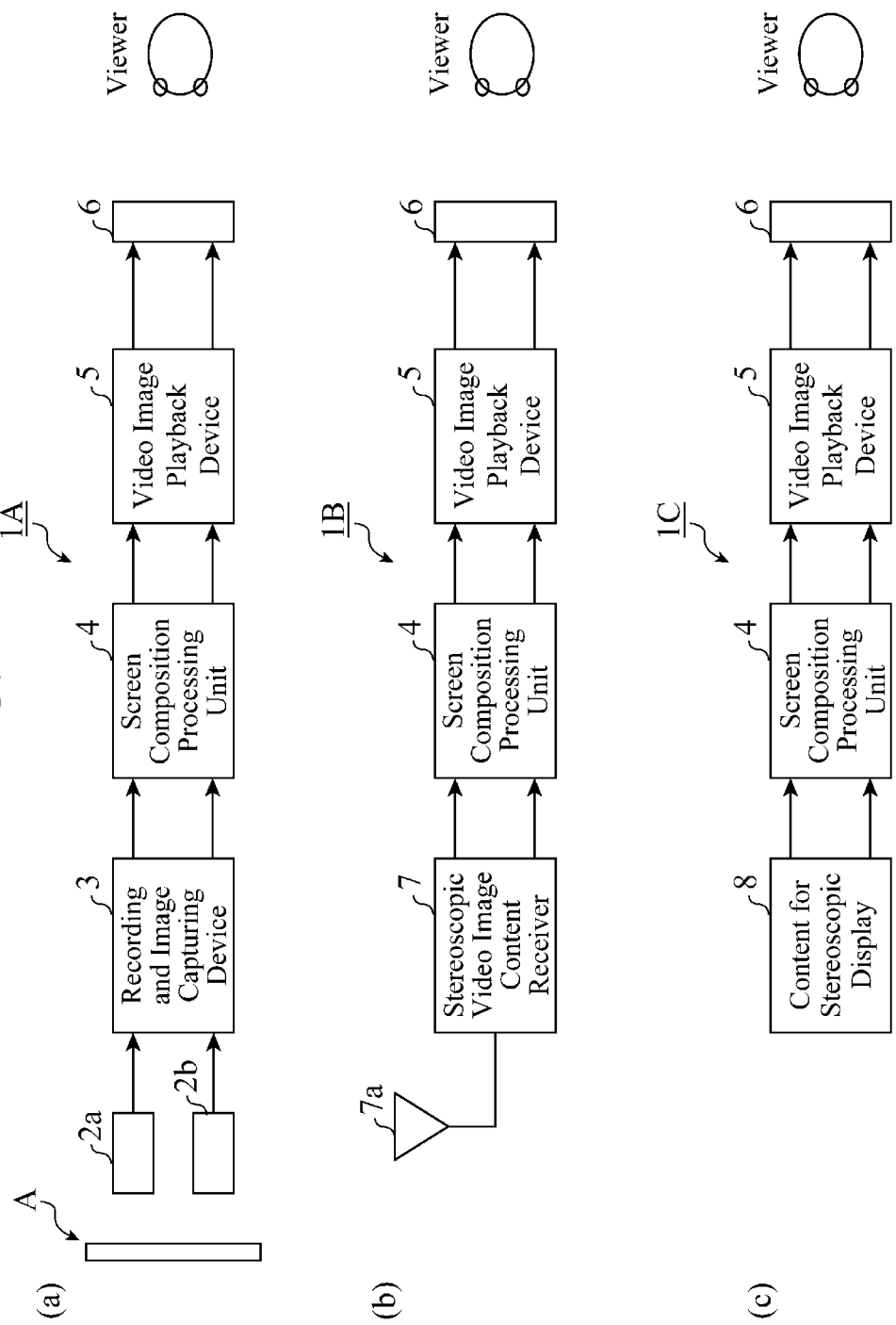
FIG. 1 is a block diagram showing an example of the structure of a stereoscopic display system which uses a 3Dimension stereoscopic display device in accordance with the present invention.

FIG. 1 is a block diagram showing an example of the structure of a stereoscopic display system which uses a 3Dimension stereoscopic display device in accordance with the present invention. FIG. 1(a) shows the stereoscopic display system 1A which displays a stereoscopic video image on the basis of right and left video images captured using cameras for both eyes. Referring to FIG. 1(a), the stereoscopic display system 1A is provided with a left-eye camera 2a, a right-eye camera 2b, a recording and image capturing device 3, a screen composition processing unit 4, a video image playback device 5, and a stereoscopic display monitor 6. The left-eye camera 2a and the right-eye camera 2b are arranged at an interval which takes into consideration the parallax difference between the two eyes, and capture a scene A which is an object to be captured under control of the recording and image capturing device 3. Right and left video data about the scene A captured by the left-eye camera 2a and the right-eye camera 2b are recorded in the recording and image capturing device 3. The screen composition processing unit 4 carries out a three-dimensional stereoscopic video image compositing process on the right and left video data read from the recording and image capturing device 3, the three-dimensional stereoscopic movie composite process being specific to the present invention, and outputs the right and left video data processed thereby to the video image playback device 5. The video image playback device 5 plays back the right and left video data processed by the screen composition processing unit 4, and then outputs the right and left video data played back thereby to the stereoscopic display monitor 6. The stereoscopic display monitor 6 displays the right and left video data played back by the video image playback device 5 in a stereoscopic manner when viewed from a viewer.

A stereoscopic display system 1B shown in FIG. 1(b) is provided with a stereoscopic video image content receiver 7 which communicates with an external device via an antenna 7a, an image composition processing unit 4, a video image playback device 5, and a stereoscopic display monitor 6. The stereoscopic video image content receiver 7 receives a stereoscopic video image content including right and left video data as mentioned above from the external, device via the antenna 7a. The screen composition processing unit 4 carries out a three-dimensional stereoscopic video image compositing process on the right and left video data included in the stereoscopic video image content received by the stereoscopic video image content receiver 7, the three-dimensional stereoscopic video image compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a).

A stereoscopic display system 1C shown in FIG. 1(c) is provided with a storage unit 8 for storing a content for stereoscopic display, an image composition processing unit 4, a video image playback device 5, and a stereoscopic display monitor 6. The content for stereoscopic display is content data including right and left video data as mentioned above. As the storage unit 8, an HDD (Hard Disk Drive) or a semiconductor memory for storing the content for stereoscopic display can be provided. As an alternative, a drive device for playing back a memory medium, such as a CD or a DVD, for storing the content for stereoscopic display can be provided.

The screen composition processing unit 4 carries out a three-dimensional stereoscopic video image compositing process on the right and left video data in the content for stereoscopic display read from the storage unit 8, the three-dimensional stereoscopic video image compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a). So-called three-dimensional data (e.g. three-dimenional map data) can be stored as the content for stereoscopic display, and the screen composition processing unit 4 can compute how the image shown by this three-dimensional data appears from each of the left and right points of view to generate right and left video data.

Figure 2:
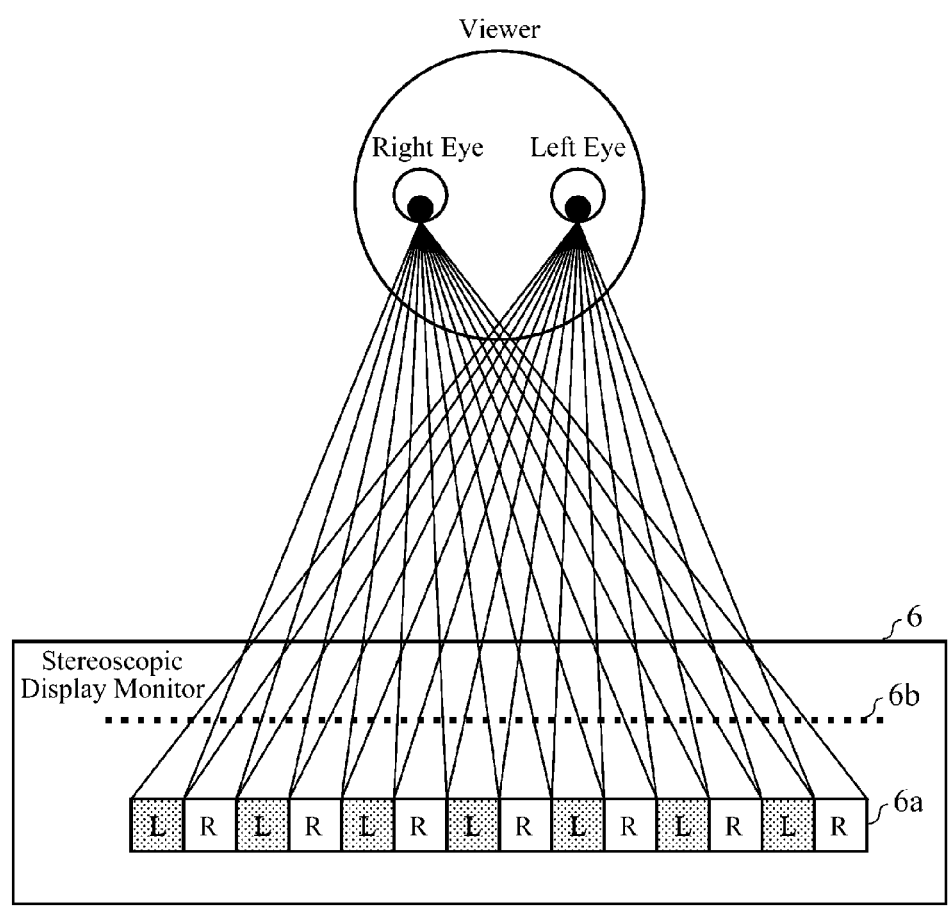
FIG. 2 is a view for explaining the principle behind a stereoscopic display in a stereoscopic display monitor.

FIG. 2 is a view for explaining the principle behind a stereoscopic display produced by the stereoscopic display monitor, and shows an example of a stereoscopic display intended for the naked eye. The stereoscopic display monitor 6 shown in FIG. 2 is provided with a liquid crystal display element group 6a and a parallax barrier unit 6b. The liquid crystal display element group 6a has a liquid crystal element group for right eyes which provides directivity for causing a right-eye video image to reach a right eye, and a liquid crystal element group for left eyes which provides directivity for causing a left-eye video image to reach a left eye. The parallax barrier unit 6b is a visual field barrier for blocking light from a backlight (not shown in FIG. 2) in order to alternately display the right-eye video image and the left-eye video image.

A video signal for left eyes (L) and a video signal for right eyes (F) which the video image playback device 5 generates by playing back the right and left video data are alternately inputted to the stereoscopic display monitor 6 in order of L, R, L, R, and . . . . When receiving the video signal for left eyes (L), the liquid crystal display element group 6a operates the liquid crystal element group for left eyes, whereas when receiving the video signal for right eyes (R), the liquid crystal display element group 6a operates the liquid crystal element group for right eyes. The parallax barrier unit 6b blocks the light emitted from the backlight and passing through the liquid crystal display element group for right eyes at the time that the liquid crystal element group for left eyes operates, whereas the parallax barrier unit 6b blocks the light emitted from the backlight and passing through the liquid crystal display element group for left eyes at the time that the liquid crystal element group for right eyes operates. As a result, the right-eye video image and the right-eye video image are displayed alternately on the screen of the stereoscopic display monitor 6, so that a viewer can watch the stereoscopic video image at his or her point of view shown in FIG. 2.

The present invention is not limited to the stereoscopic display monitor 6 having the structure shown in FIG. 2, and a monitor which implements stereoscopic vision by using another mechanism can be alternatively used. For example, a method of providing a stereoscopic image by causing a viewer to wear glasses having left and right lenses to which different polarizing plates are attached as exclusive glasses can be used.

Figure 3:
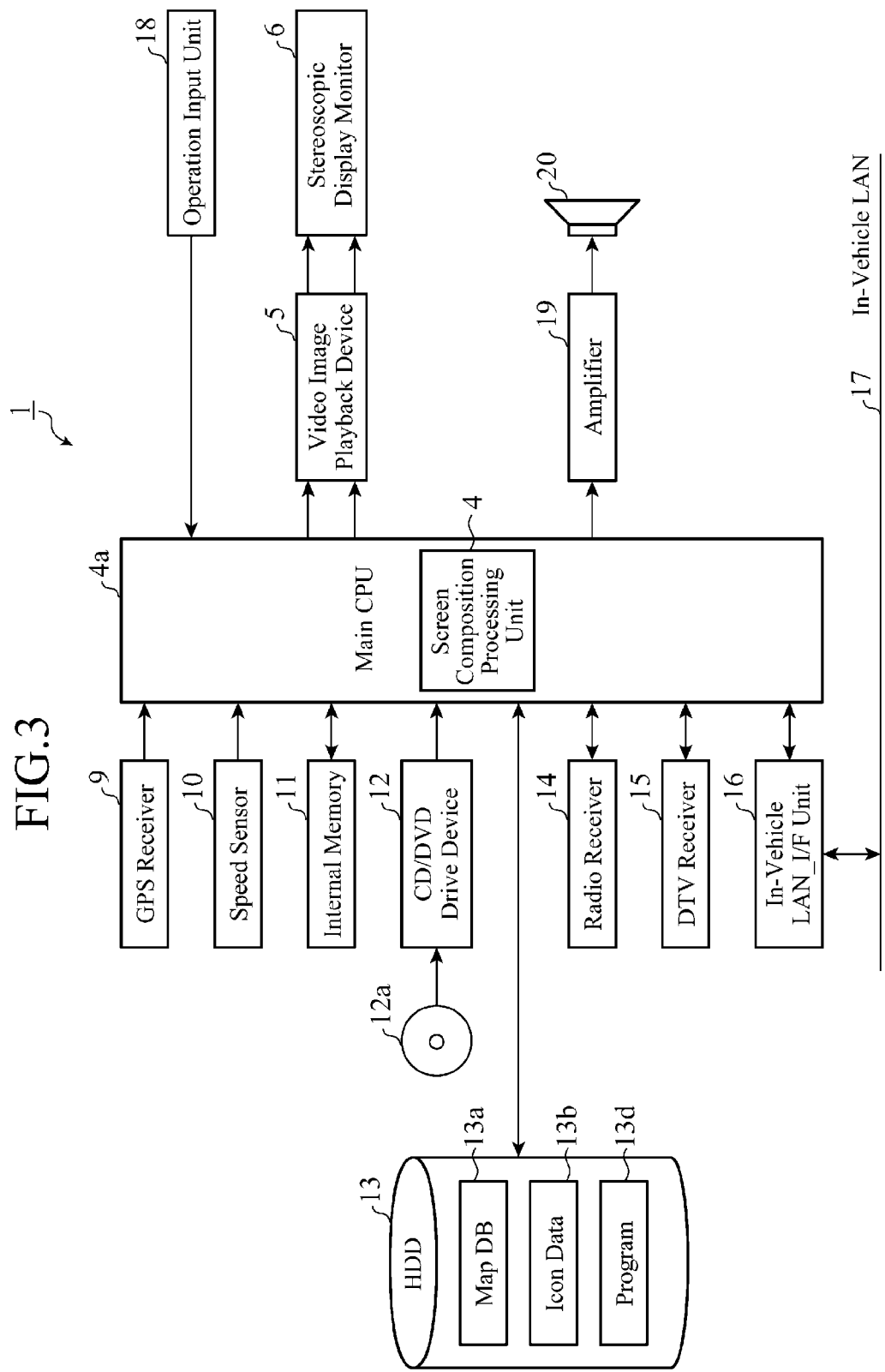
FIG. 3 is a block diagram showing the structure of an in-vehicle information system which uses the 3Dimension stereoscopic display device in accordance with Embodiment 1 of the present invention.

FIG. 3 is a block diagram showing the structure of an in-vehicle information system which uses the 3Dimension stereoscopic display device in accordance with Embodiment 1 of the present invention. In the example shown in FIG. 3, the in-vehicle information system 1 functions as a stereoscopic display system shown in FIG. 1, regarding a display of an image, such as a map or a video image. Further, the in-vehicle information system 1 is provided with a main CPU 4a, a video image playback device 5, a stereoscopic display monitor 6, a GPS (Global Positioning System) receiver 9, a speed sensor 10, an internal memory 11, a CD/DVD drive device 12, an HDD 13, radio receiver 14, a DTV receiver 15, an in-vehicle LAN_I/F unit 16, an operation input unit 18, an amplifier 19, and a speaker 20.

The main CPU 4a controls each component disposed in the in-vehicle information system 1. This main CPU 4a functions as the screen composition processing unit 4 shown in FIG. 1 by executing a program 13d (application program for in-vehicle information processing) stored in the HDD 13. The video image playback device 5 plays back the right and left video data on which the screen composition processing unit 4 of the main CPU 4a has carried out a compositing process, and outputs the right and left video data played back thereby to the stereoscopic display monitor 6. Further, the stereoscopic display monitor 6 displays the right and left video data played back by the video image playback device 5 in a stereoscopic manner when viewed from a viewer.

The GPS receiver 9 receives the position information about the position of the vehicle from GPS satellites, and the speed sensor 10 detects vehicle speed pulses for calculating the vehicle speed of the vehicle. The internal memory 11 serves as a work area when the main CPU 4a executes the application program for in-vehicle information processing. The CD/DVD drive device 12 plays back an AV source stored in a memory medium 12a, such as a CD or DVD. When stereoscopic display video data are included in an AV source stored in the memory medium 12a, the CD/DVD drive device functions as the stereoscopic video image content receiver 7 shown in FIG. 1(b), and the in-vehicle information system 1 functions as the stereoscopic display system 1B shown in FIG. 1(b).

The HDD (hard disk drive) 13 is a mass storage device mounted in the in-vehicle information system 1, and stores a map database (abbreviated as a map DB hereafter) 13a, icon data 13b, and a program 13d. The map DB 13a is a database in which map data for use in navigation processing are registered. POI information in which the locations of POIs (Points Of Interest) on a map or detailed information associated with these POIs are described is also included in the map data. The icon data 13b show icons which are to be displayed on the screen of the stereoscopic display monitor 6. The icon data include icons showing operation buttons used for enabling the user to carry out various operations on the screen, etc. The program 13d is an applicatidn program for in-vehicle information processing which the main. CPU 4a executes. For example, the program has an application program for map display including a program module for implementing the functions of the screen compositing process unit 4.

The radio receiver 14 receives a radio broadcast, and makes a channel selection according to, for example, an operation on a not-shown button selector. The DIV receiver 15 receives a digital television broadcast, and makes a channel selection according to an operation on a not-shown button selector, like the radio receiver 14. The DTV receiver 15 also functions as the stereoscopic video image content receiver 7 shown in FIG. 1(b) when three-dimensional stereoscopic display video data are included in a digital television broadcast received thereby, and the in-vehicle information system 1 functions as the stereoscopic display system 1B shown in FIG. 1(b).

The in-vehicle LAN_I/F unit 16 is an interface between an in-vehicle LAN (Local Area Network) 17 and the main CPU 4a, and relays data communications between, for example, other equipment connected to the in-vehicle LAN 17, and the main CPU 4a. Further, the storage unit 8 shown in FIG. 1(c) is connected to the in-vehicle LAN 17, and, when the in-vehicle LAN_I/F unit 16 is regarded as a component for relaying between this storage unit 8 and the screen compositing process unit 4 of the main CPU 4a, the in-vehicle information system 1 functions as the stereoscopic display system 1C shown in FIG. 1(c).

The operation input unit 18 is a component for enabling the user to perform an operational input. As this operation input unit 18, a key switch (operation switch) disposed in the vicinity of the screen of the stereoscopic display monitor 6 can be provided, for example. In a case in which a touch panel is disposed on the screen of the stereoscopic display monitor 6, the touch switch can be provided as the operation input unit 18.

Sound signals played back by the CD/DVD drive device 12, the radio receiver 14, and the DIV receiver 15 and a sound signal from the main CPU 4a are amplified by the amplifier 19, and a sound is outputted via the speaker 20. As the sound signal from the main CPU 4a, there is a route guidance voice signal generated through the navigation processing, for example.

Next, the operation of the 3Dimension stereoscopic display device will be explained. When displaying a planar image in a stereoscopic manner, the 3Dimension stereoscopic display device in accordance with Embodiment 1 composites the planar image and another image into a three-dimensional stereoscopic image in which a virtual display of a planar image is placed at a position on backward with respect to the screen of the stereoscopic display monitor 6 or in which the virtual display of the planar image is placed at the same position as the screen of the stereoscopic display monitor 6 according to whether or not the user is performing an operation on the system, and displays the three-dimensional stereoscopic image. For example, in the case of displaying a planar map in a map display of an in-vehicle navigation device, the 3Dimension stereoscopic display device places the virtual display of the planar map at a position backward with respect to the screen of the stereoscopic display monitor 6 (i.e., farther away from the driver than the screen) when the user is not performing any operation on the system.

Figure 4:
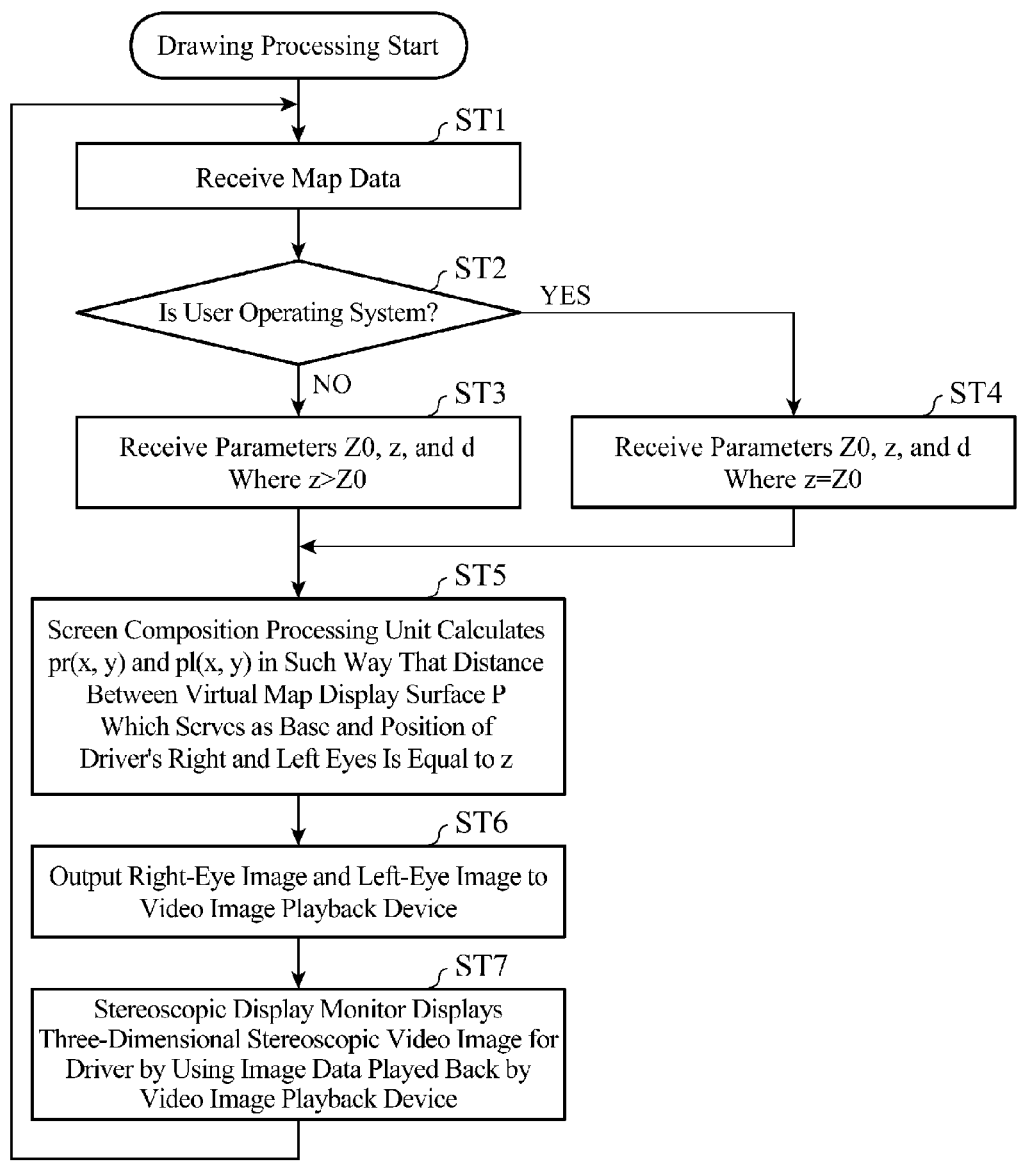
FIG. 4 is a flow chart showing a flow of a screen compositing process carried out by the 3Dimension stereoscopic display device in accordance with Embodiment 1.
Figure 5:
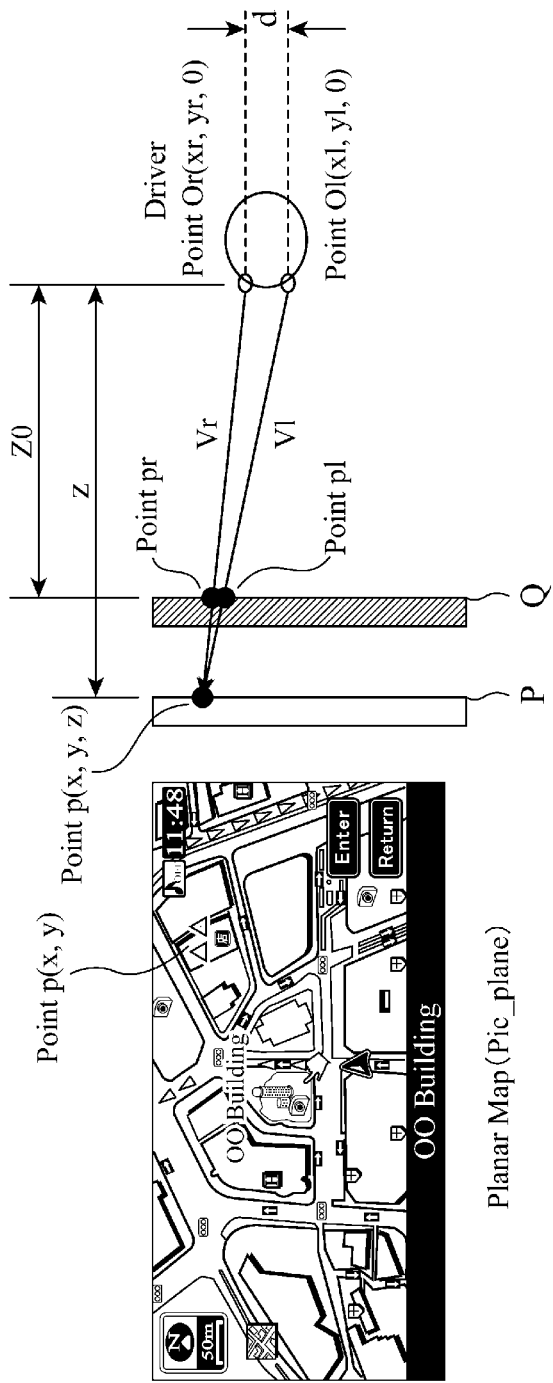
FIG. 5 is a view for explaining a screen compositing process of placing a virtual display position of a planar map at a position backward with respect to the screen of a stereoscopic display monitor.
Figure 6:
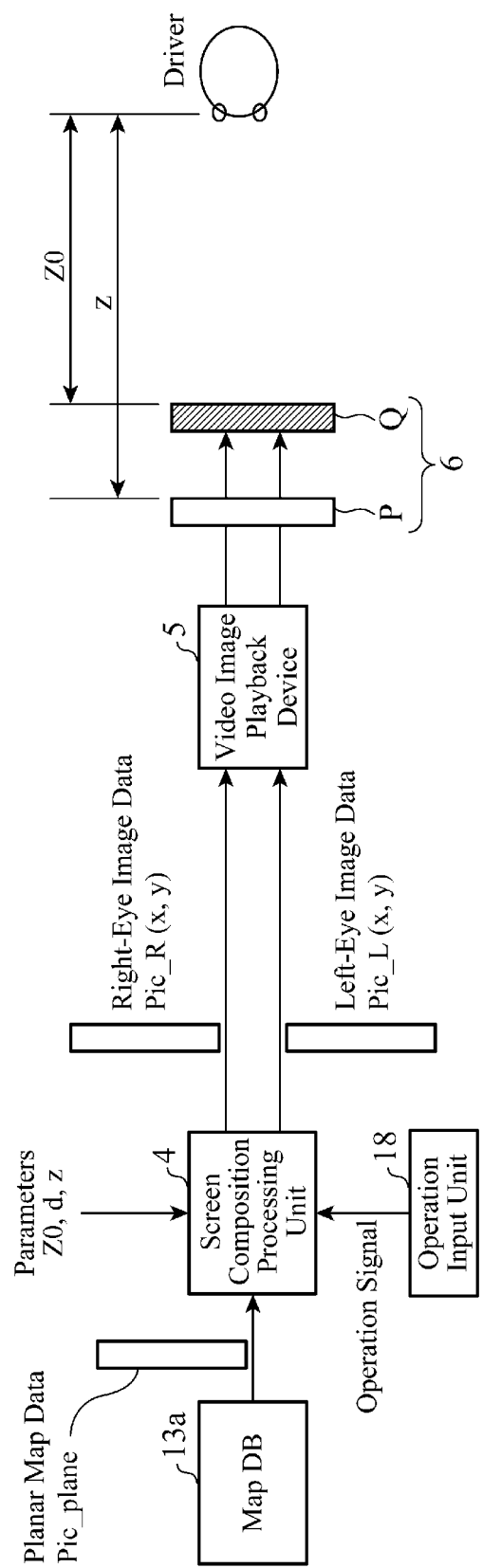
FIG. 6 is a view showing a data flow in the screen compositing process shown in FIG. 5.

FIG. 4 is a flow chart showing a flow of the screen compositing process carried out by the 3Dimension stereoscopic display device in accordance with Embodiment 1, and shows the process of placing the virtual display of the planar map at a position backward with respect to the screen of the stereoscopic display monitor 6. Further, FIG. 5 is a view for explaining the screen compositing process of placing the virtual, display of the planar map at a position backward with respect to the screen of the stereoscopic display monitor. FIG. 6 is a view showing a data flow in the screen compositing process shown in FIG. 5. Hereafter, the details of the screen compositing process will be explained with reference to FIG. 4, and FIGS. 5 and 6 will be referred to as needed.

First, the main CPU 4a reads map data from the map DE 13a stored in the HDD 13, and generates planar map data Pic_plane according to a predetermined map drawing algorithm, as shown in FIG. 6. The planar map data Pic_plane are the one about a planar map which is described in, for example, a left part of FIG. 5.

In the example shown in FIG. 5, the planar map shown by the planar map data Pic_plane is displayed on the virtual map display surface P placed at a position backward with respect to the screen. Q of the stereoscopic display monitor 6. Hereafter, the distance from the position of the driver's eyes to the screen Q of the stereoscopic display monitor 6 is expressed as Z0, and the distance from the position of the driver's eyes to the virtual map display surface P is expressed as z. In the example shown in FIG. 5, the following relationship: z>Z0 is established.

Further, the position of the drivers right eye is expressed as a point Or, (xr, yr, 0), the position of the driver's eye is expressed as a point Ol (xl, yl, 0), and the gap between the left and right eyes is expressed as d. That is, the following relationship: |xr−xl|=d is established. The projection of a point p(x, y) on the planar map shown by the planar map data Pic_plane onto the virtual map display surface P yields a point p(x, y, z) on the map display surface P.

Right-eye image data Pic_R(x, y) of the planar map are expressed by a set of points pr at each of which a straight line (vector Vr) which connects between a point p(x, y, z) on the virtual map display surface P and the point Or (xr, yr, 0) which is the position of die right eye intersects the screen Q of the stereoscopic display monitor 6. Similarly, left-eye image data Pic_L(x, y) of the planar map are expressed by a set of points pl at each of which a straight line vector Vl) which connects between the point p(x, y, z) on the virtual map display surface P and the point Ol(xl, yl, 0) which is the position of the left eye intersects the screen Q of the stereoscopic display monitor 6.

The screen composition processing unit 4 receives the planar map data Pic_plane which are generated by the main CPU 4a in the above-mentioned way (step ST1). The screen composition processing unit 4 then determines whether or not the driver is operating the system according to an operation input signal, from the operation input unit 18 (step ST3). When the driver is not operating the system, (when NO in step ST2), the screen composition processing unit 4 inputs the parameters Z0, z, and d (step ST2). At this time, the distance Z0 from the position of the driver's eyes to the screen Q of the stereoscopic display monitor 6 and the distance z from the position of the driver's eyes to the virtual map display surface P has the following relationship: z>Z0.

In contrast, when the driver is operating the system (when YES in step ST2), the screen composition processing unit 4 inputs the parameters Z0, z, and d (step ST4). At this time, the distance Z0 from the position of the driver's eyes to the screen Q of the stereoscopic display monitor 6 and the distance z from the position of the driver's eyes to the virtual map display surface P has the following relationship: z=Z0.

The screen composition processing unit 4, in step ST5, calculates the points pr and pl in such a way that the distance between the virtual, map display surface P and each of the positions Or and Ol of the driver's eyes is equal to z. More specifically, the screen composition processing unit 4 generates the above-mentioned right-eye image data Pic_R(x, y) and the above-mentioned left-eye image data Pic_L (x, y) by using the planar map data Pic_plane and the parameters Z0, z, and d. After that, the screen composition processing unit 4 outputs the right-eye image data Pic_R(x, y) and the left-eye image data Pic_L (x, y) to the video image playback device 5 (step ST6).

The video image playback device 5 plays back the right-eye image data Pic_R(x, y) and the left-eye image data Pic_L (x, y) which are generated by the screen composition processing unit 4, and outputs them to the stereoscopic display monitor 6. The stereoscopic display monitor 6 displays the planar map in a stereoscopic manner by using the right-eye image data Pic_R(x, y) and the left-eye image data Pic_L (x, y) which are played back by the video image playback device 5 (step ST7).

When the driver is not operating the system, the 3Dimension stereoscopic display device makes the planar map shown by the planar map data Pic_plane look as if it is displayed on the virtual map display surface P placed at a position backward with respect to the screen Q of the stereoscopic display monitor 6 when viewed from the driver's position by using stereoscopic vision because the following relationship: z>Z0 is established. For example, when z=Z0+20 cm in step ST3, the planar map looks as if it is displayed on the virtual map display surface P placed at a position 20 cm farther away from the driver than the screen Q of the stereoscopic display monitor 6. In contrast, when the driver is operating the system, the 3Dimension stereoscopic display device makes the planar map look as if the virtual map display surface P coincides with the screen Q of the stereoscopic display monitor 6, and the planar map is displayed on the screen Q when viewed from the driver's position because the following relationship: z=Z0 is established.

Figure 7:
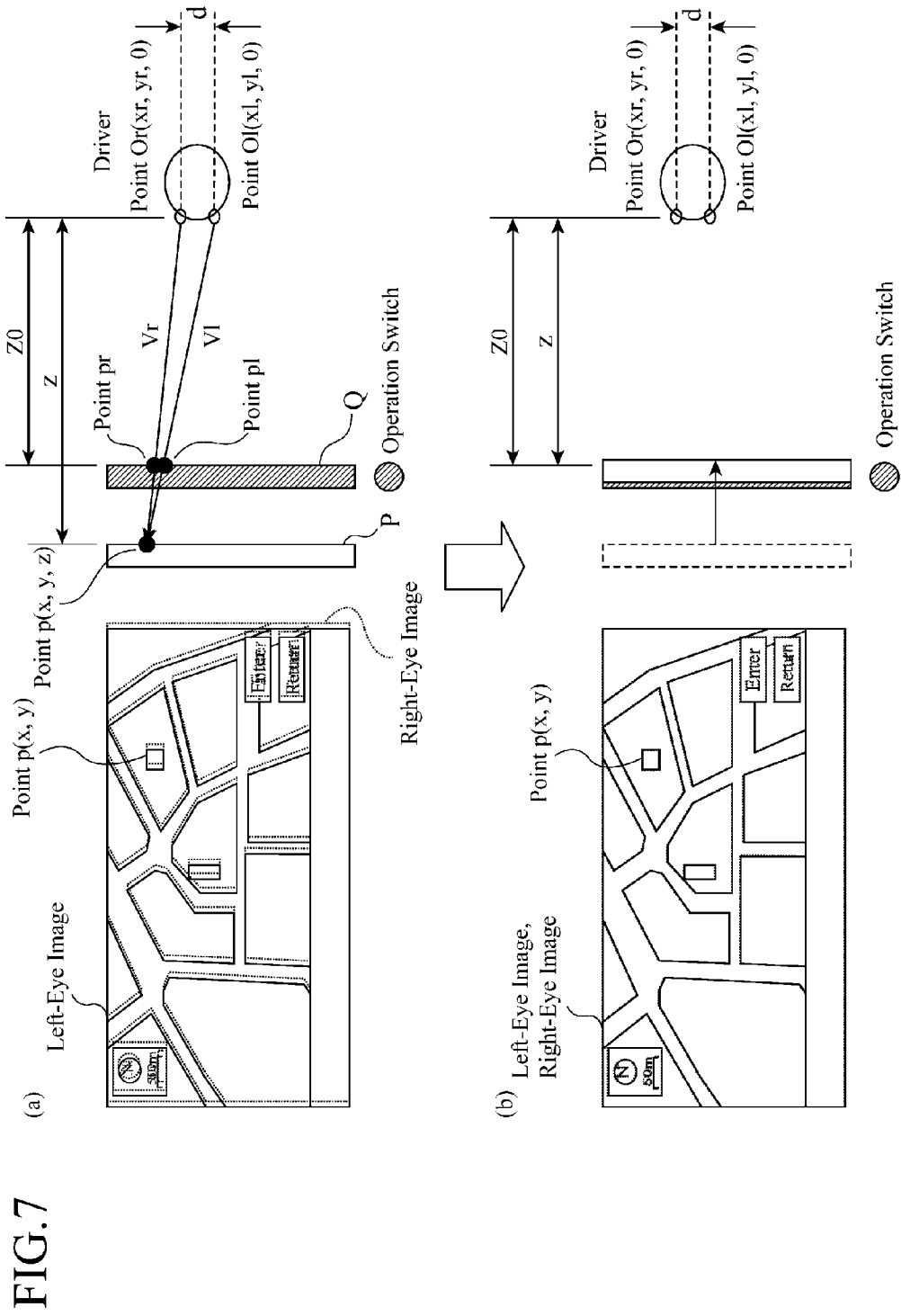
FIG. 7 is a view showing an outline of the screen compositing process carried out by the 3Dimension stereoscopic display device in accordance with Embodiment 1.

FIG. 7 is a view showing an outline of the screen compositing process carried out by the 3Dimension stereoscopic display device in accordance with Embodiment 1. In the example shown in FIG. 7, the operation input unit 18 is operation switches disposed in the vicinity of the screen of the stereoscopic display monitor 6. The screen composition processing unit 4 determines whether or not the driver is operating the system according to whether a menu switch, among the operation switches, is being operated. More specifically, when the menu switch is pushed, the screen composition processing unit determines that "the user is operating the system."

When no operation switch (menu switch) is being operated, the screen composition processing unit sets the relationship between the distances to z>Z0, as shown in FIG. 7(a). More specifically, the screen composition processing unit places the virtual map display surface P at a position farther away from the driver than the screen Q of the stereoscopic display monitor 6. At this time, as described on a left side of FIG. 7(a), the information to be displayed is displayed via stereoscopic vision in such a way that the information is focused at a position farther away from the driver than the actual screen Q of the stereoscopic display monitor 6. As a result, the 3Dimension stereoscopic display device can lessen the difference in focus distance between the focus position at which the road scene ahead of the vehicle at which the driver is looking while driving the vehicle is located, and the virtual map display surface P and can improve the safety of the driver when the driver is looking at the map display from a distance.

When the driver looks at the information displayed on the screen of the stereoscopic display monitor 6 and then continues operating the system, a display of the information to be displayed at a position closer to the driver makes it easier for the driver to look at the information and operate the system. Therefore, when an operation switch is operated, the screen composition processing unit sets the relationship between the distances z=Z0, as shown in FIG. 7(b). More specifically, the 3Dimension stereoscopic display device makes the virtual map display surface P coincide with the screen Q of the stereoscopic display monitor 6. At this time, the 3Dimension stereoscopic display device displays the information to be displayed in such a way that the information is focused on the actual screen Q of the stereoscopic display monitor 6, as described on a left side of FIG. 7(b). Thus, the 3Dimension stereoscopic display device can provide a display screen which makes it easy for the driver to operate the system. When the operation is completed, the 3Dimension stereoscopic display device returns the virtual map display surface P to the state in which the virtual map display surface is placed at a position farther away from the driver than the screen Q of the stereoscopic display monitor 6 by resetting the relationship between the distances to z>Z0.

In the above-mentioned process, when it is determined with the user is operating the system, instead of setting the relationship between the distances to z=Z0, the 3Dimension stereoscopic display device can make the virtual, map display surface P coincide with the screen Q of the stereoscopic display monitor 6 by gradually bringing z close to Z0 to gradually move the map display surface P closer to the screen. For example, when it is determined with the user is operating the system, the screen composition processing unit 4 changes z in steps of a predetermined value in such a way that z becomes equal to Z0 within a predetermined time interval.

Figure 8:
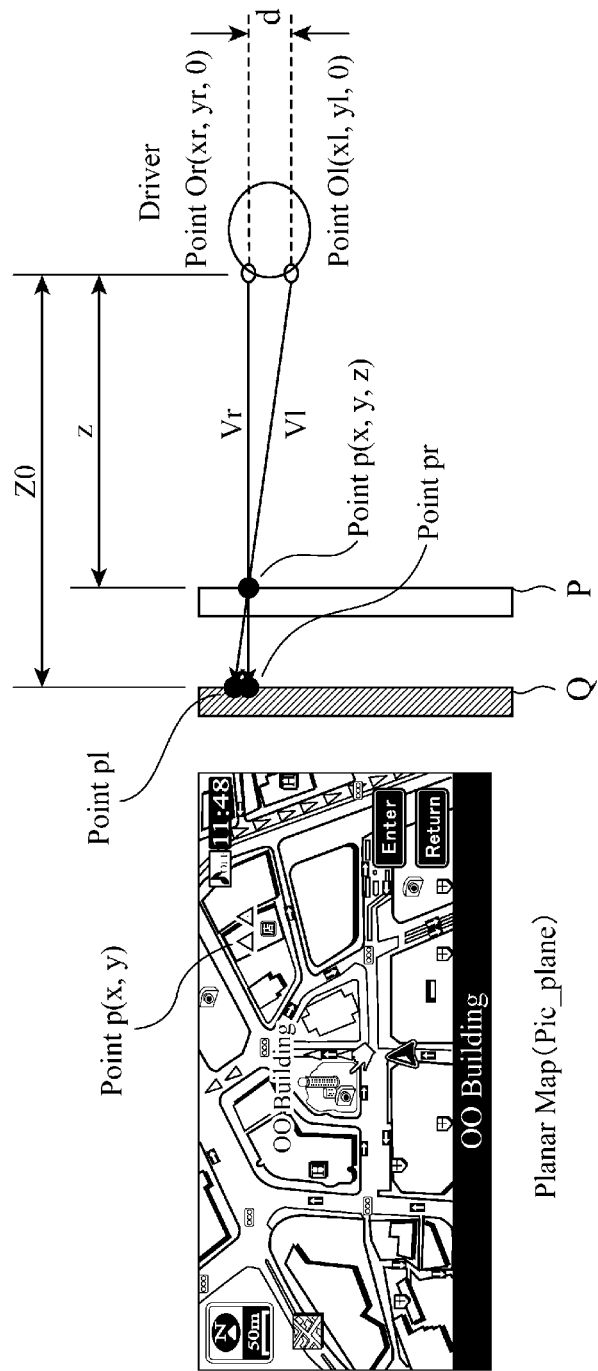
FIG. 8 is a view for explaining a screen compositing process of placing a virtual, display of a planar map at a position forward with respect to the screen of the stereoscopic display monitor.
Figure 9:
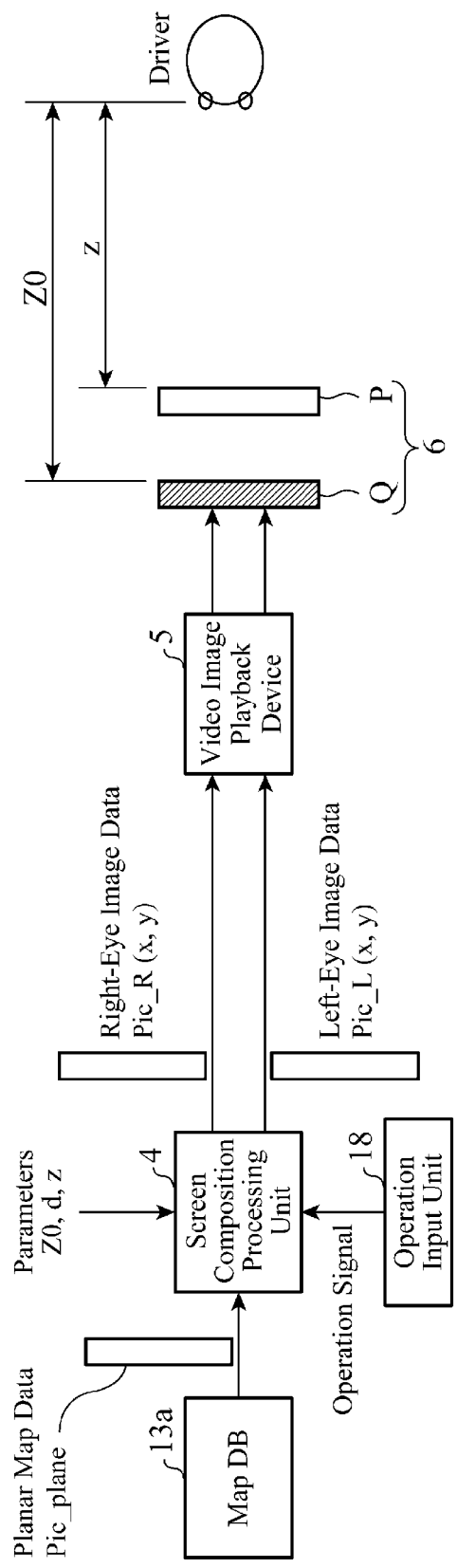
FIG. 9 is a view showing a data flow in the screen compositing process shown in FIG. 8.

When it is determined with the user is operating the system, instead of setting the relationship between the distances to z=Z0, the 3Dimension stereoscopic display device can alternatively set the relationship between the distances to z<Z0 to display the information to be displayed by using stereoscopic vision in such a way that the information is floating from the screen Q of the stereoscopic display monitor 6. FIG. 8 is a view for explaining a screen compositing process of placing the virtual display of the planar map at a position forward with respect to the screen of the stereoscopic display monitor. FIG. 9 is a view showing a data flow in the screen compositing process shown in FIG. 8. As shown in FIG. 8, when z<Z0, the 3Dimension stereoscopic display device makes the planar map shown by the planar map data Pic_plane look as if it is displayed on the virtual map display surface P placed at a position forward with respect to the screen Q of the stereoscopic display monitor 6 when viewed from the driver's position by using stereoscopic vision.

Further, the 3Dimension stereoscopic display device can set the distance z between the driver and the virtual map display surface P of the planar map to the screen composition processing unit 4 according to the user operation, and enables the user to change the already set distance according to the user operation.

As mentioned above, the 3Dimension stereoscopic display device in accordance with this Embodiment 1 includes: the operation input unit 18 for accepting a user operation; the video image playback device 5 for playing back a right-eye image or video image and a left-eye image or video image for three-dimensional stereoscopic display of an inputted image or video image which is a display object; the stereoscopic display monitor 6 for producing a three-dimensional stereoscopic display of the right-eye image or video image and the left-eye image or video image for three-dimensional stereoscopic display of the image or video image which is the display object, the right-eye and left-eye images or video images being played back by the video image playback device 5; and the screen composition processing unit 4 for generating the right-eye image or video image and the left-eye image or video image for three-dimensional stereoscopic display in which a virtual display surface P for three-dimensional stereoscopic display of the image or video image which is the display object is moved with respect to the screen Q of the stereoscopic display monitor 6 according to whether a user operation using the operation input unit 18 is being performed to output the right-eye image or video image and the left-eye image or video image generated thereby to the video image playback device 5 in this structure, when no user operation using the operation input unit 18 is being performed, the screen composition processing unit 4 generates a right-eye image and a left-eye image for three-dimensional stereoscopic display in which the virtual display surface P for three-dimensional stereoscopic display of the image which is the display object is moved backward with respect to the screen Q of the stereoscopic display monitor unit, whereas when a user operation using the operation input unit 18 is being performed, the screen composition processing unit 4 generates a right-eye image or video image and a left-eye image or video image for three-dimensional stereoscopic display in which a virtual display surface for three-dimensional stereoscopic display of the image or video image which is the display object is moved to a position close to or the same as to that of the screen Q of the stereoscopic display monitor. By doing in this way, the 3Dimension stereoscopic display device can provide an HMI with a three-dimensional stereoscopic display which enables the user to perform an operation matching the user's intuition.

In above-mentioned Embodiment 1, the example of displaying a three-dimensional stereoscopic image in which the virtual display of the planar image is placed at a position backward with respect to, the same as, or forward with respect to the screen of the stereoscopic display monitor according to whether or not the user is operating the system is shown. As an alternative, the 3Dimension stereoscopic display device can detect whether or not the user is going to perform an operation on the system, and display such a three-dimensional stereoscopic image as above before the user starts operating the system.

Figure 10:
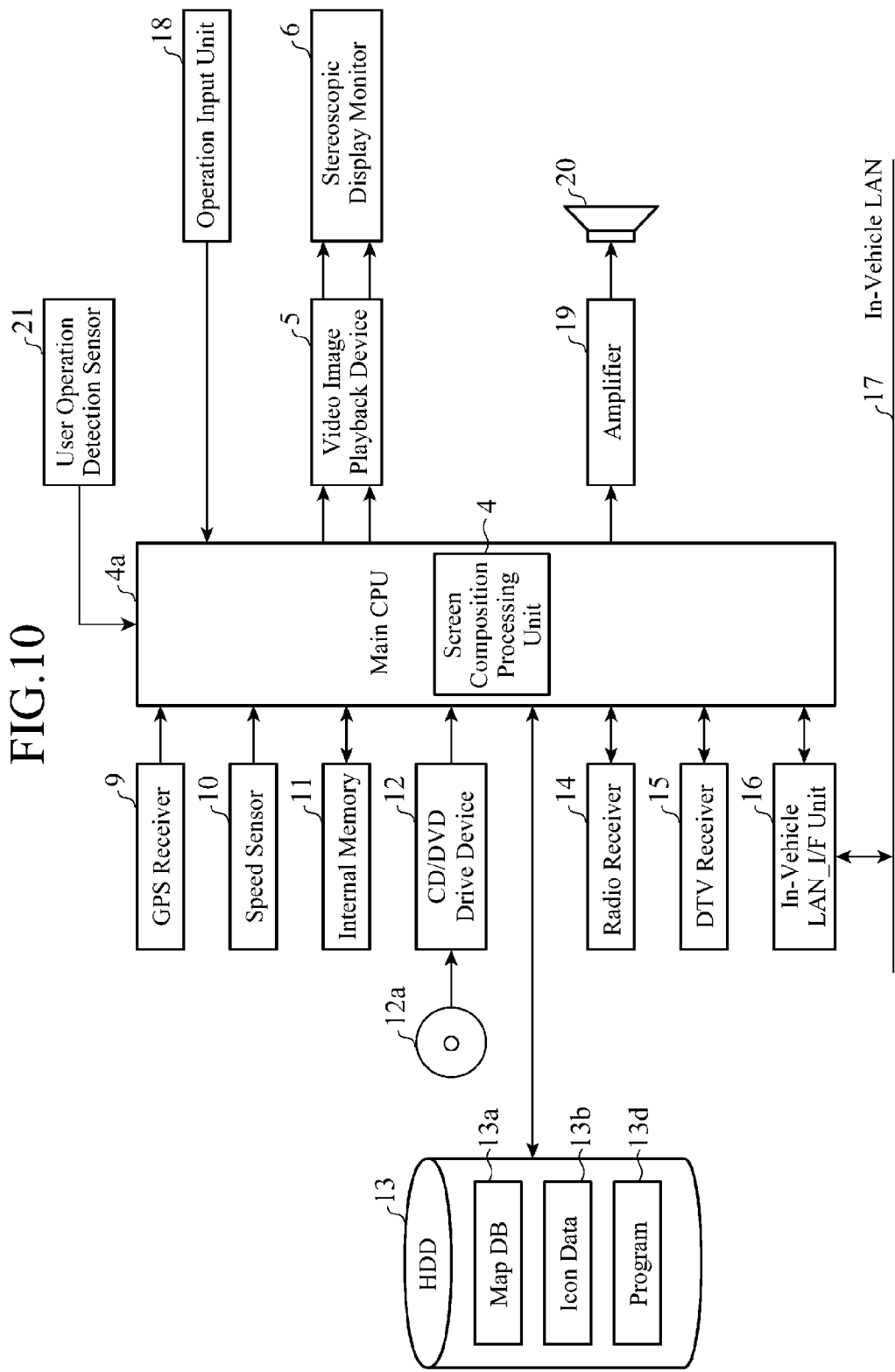
FIG. 10 is a block diagram showing the structure of another example of the in-vehicle information system which uses the 3Dimension stereoscopic display device in accordance with Embodiment 1.

FIG. 10 is a block diagram showing the structure of another example of the in-vehicle information system which uses the 3Dimension stereoscopic display device in accordance with Embodiment 1. Referring to FIG. 10, the in-vehicle information system 1A is provided with a user operation detection sensor 21 in addition to the structure shown in FIG. 3. The user operation detection sensor 21 detects a user's behavior of going to operate the operation input unit 18. For example, the user operation detection sensor can be implemented by a camera device equipped with a camera and an arithmetic processing unit for carrying out image recognition on an image captured by the camera. More specifically, the arithmetic processing unit carries out image recognition on the user's behavior of going to operate the operation input unit 18 by performing an image analysis on an image of the user captured by the camera. Further, in a case in which the operation input unit 18 consists of a touch panel, a proximity sensor for detecting an approach of a pointing object, such as a finger, to a touch surface of the touch panel according to a change in its capacitance can implement the user operation detection sensor 21. In FIG. 10, the same components as those shown in FIG. 3 and like components are designated by the same reference numerals as those shown in the figure, and the explanation of the components will be omitted hereafter.

When the user operation detection sensor 21 detects that the user is going to operate the system, the screen composition processing unit 4 sets the relationship between the distances z=Z0 or z<Z0 in the three-dimensional stereoscopic image in which the virtual display surface of the display screen which is the operation target is displayed at a position farther away from the user than the screen of the stereoscopic display monitor 6 to generate a three-dimensional stereoscopic image in which the virtual display surface of the display screen which is the operation target looks as if it is floating at the same position as or at a position close to the screen of the stereoscopic display monitor 6 by using stereoscopic vision. As a result, at the time that the user is going to operate the system, the 3Dimension stereoscopic display device makes the display screen which is the operation target look as if it is displayed in such a way as to be floating at the same position as or at a position close to the screen of the stereoscopic display monitor 6 when viewed from the user's position. By doing in this way, the 3Dimension stereoscopic display device can provide a further user-friendly display device.

Embodiment 2

Figure 11:
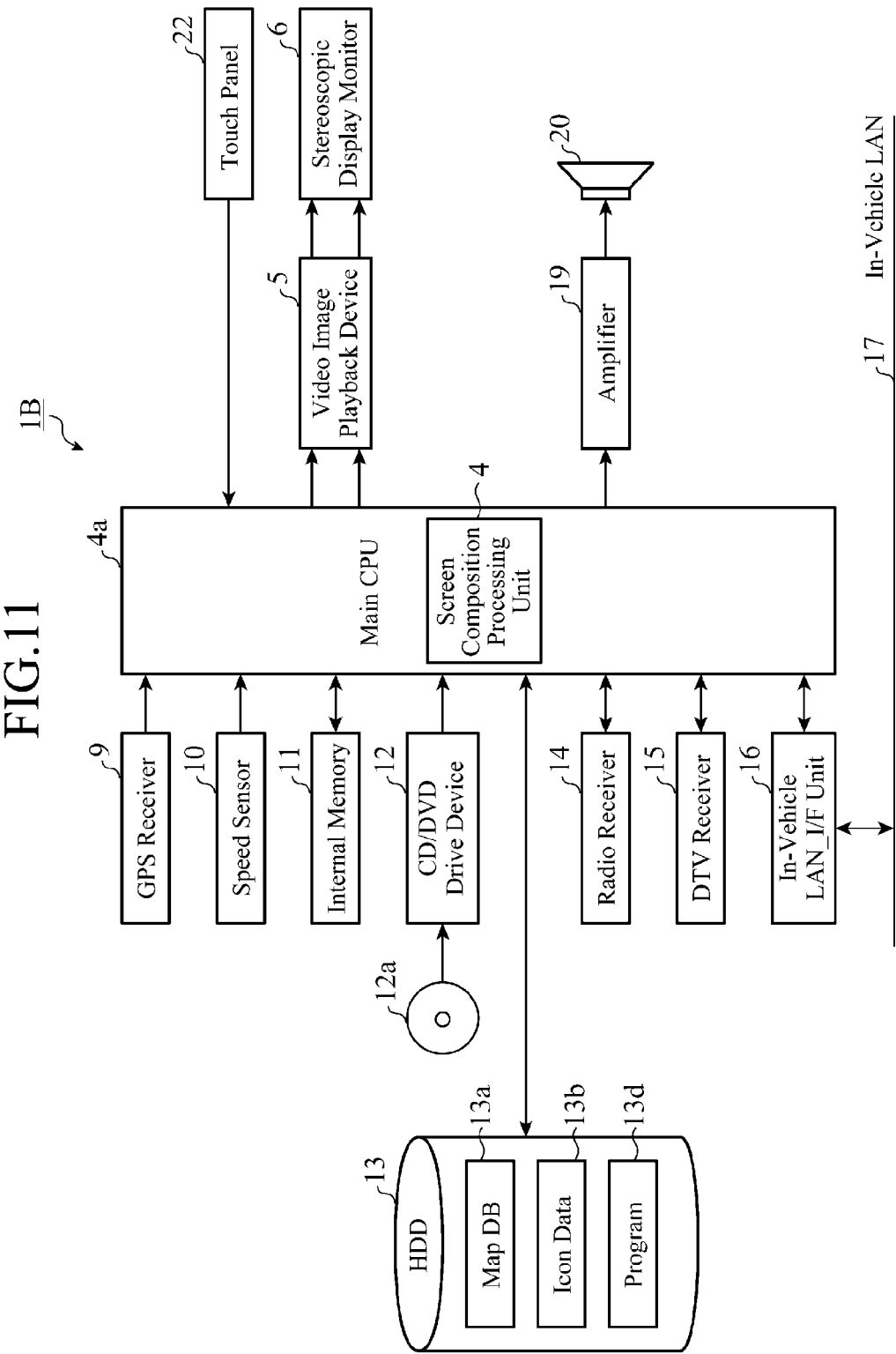
FIG. 11 is a block diagram showing the structure of an in-vehicle information system which uses a 3Dimension stereoscopic display device in accordance with Embodiment 2 of the present invention.

FIG. 11 is a block diagram showing the structure of an in-vehicle information system which uses a 3Dimension stereoscopic display device in accordance with Embodiment 2 of the present invention. Referring to FIG. 11, the in-vehicle information system 1B is provided with a touch panel 22, instead of the operation input unit 18 among the structural components of that in accordance with above-mentioned Embodiment 1 shown with reference to FIG. 3. The touch panel 22 is a device for detecting a touch operation on an operation screen displayed on a stereoscopic display monitor 6 and is constructed in such a way as to be able to detect "contact" of a pointing object, such as a user's finger, with a touch surface thereof and a "push" on the touch surface after a pointing object comes in contact with the touch surface. In FIG. 11, the same components as those shown in FIG. 3 and like components are designated by the same reference numerals as those shown in the figure, and the explanation of the components will be omitted hereafter.

Figure 12:
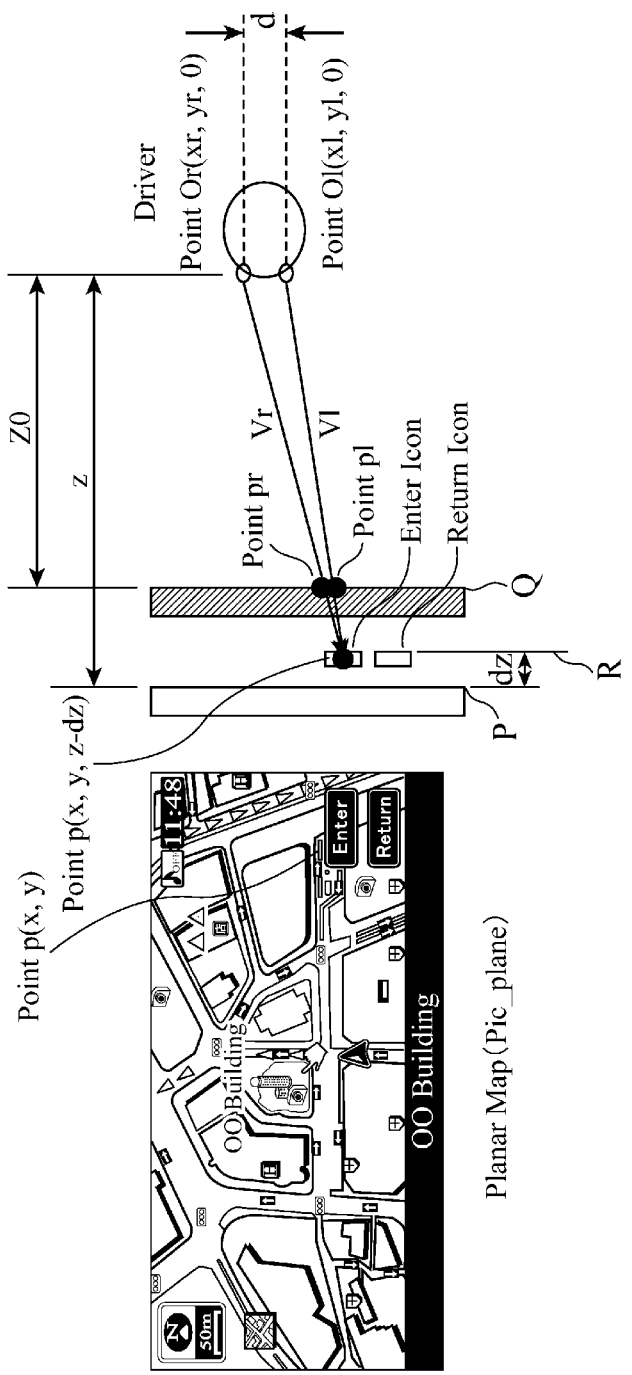
FIG. 12 is a view for explaining a screen compositing process of placing a virtual map display surface of a planar map at a position backward with respect to the screen of a stereoscopic display monitor, and placing a virtual display surface of icons at a position forward with respect to the virtual map display surface of the planar map.
Figure 13:
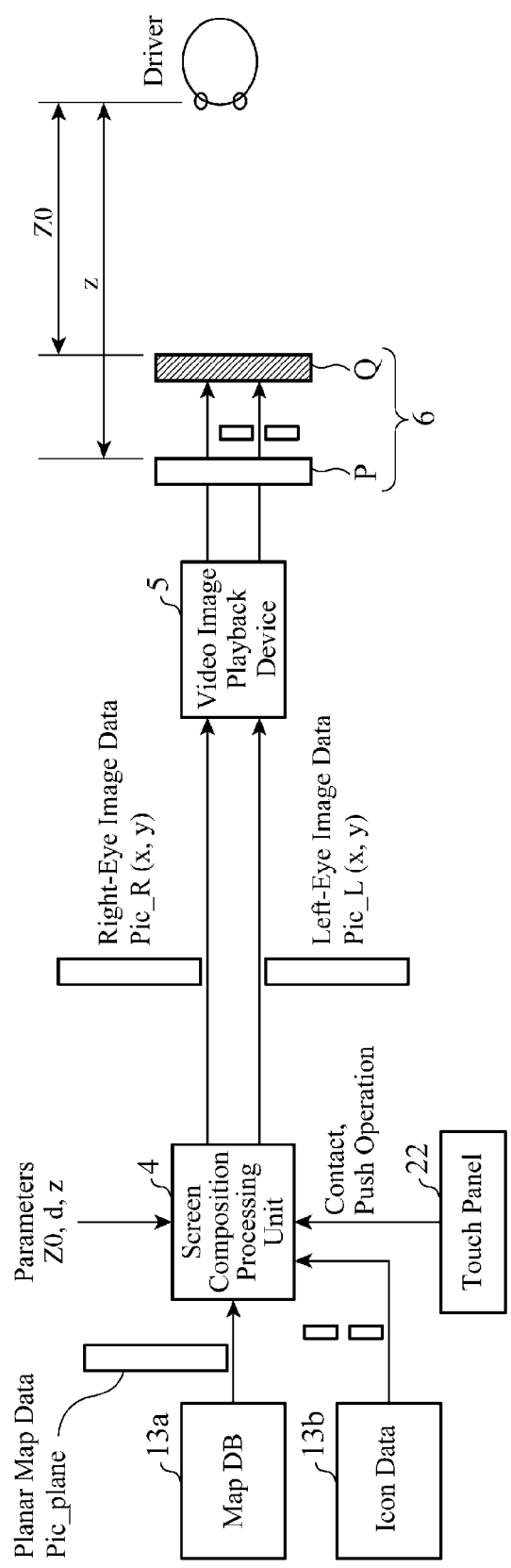
FIG. 13 is a view showing a data flow in the screen compositing process shown in FIG. 12.

Next, the operation of the 3Dimension stereoscopic display device will be explained. FIG. 12 is a view for explaining a screen compositing process of placing a virtual map display surface P of a planar map at a position backward with respect to the screen Q of the stereoscopic display monitor, and placing a virtual display surface R of icons at a position forward with respect to the virtual map display surface P of the planar map. FIG. 13 is a view showing a data flow in the screen compositing process shown in FIG. 12.

First, a main CPU 4a reads map data from a map DB 13a stored in an HDD 13, and generates planar map data Pic_plane according to a predetermined map drawing algorithm, as shown in FIG. 13. The planar map data Pic_plane show the planar map which is described in, for example, a left part of FIG. 12. The main CPU 4a also reads icon data about icons which are to be displayed on the planar map shown by the planar map data Pic_plane from icon data 13b stored in the HDD 13.

In the example shown in FIG. 12, the planar map shown by the planar map data Pic_plane is displayed on the virtual map display surface P placed at a position backward with respect to the screen Q of the stereoscopic display monitor 6. In addition, the 3Dimension stereoscopic display device displays an enter button and a return button which are operation icons on the virtual display surface R which is placed at a position forward with respect to the virtual map display surface P of the planar map. Hereafter, the distance between the map display surface P of the planar map and the display surface R of the icons is expressed as dz. More specifically, the 3Dimension stereoscopic display device makes each of the icons of the enter button and the return button look as if it is floating the distance dz from the planar map with respect to the driver's position by using stereoscopic vision. In the example shown in FIG. 12, the distance Z0 between the position of the driver's eyes and the screen Q of the stereoscopic display monitor 6 and the distance z between the position of the driver's eyes and the virtual map display surface P have the following relationship: z>Z0.

Right-eye image data Pic_R(x, y) of the planar map are expressed by a set of points pr at each of which a straight line (vector Vr) which connects between a point p(x, y, z) on the virtual map display surface P or a point p(x, y, z-dz) on the display surface R and the point Or, (xr, yr, 0) which is the position of the right eye intersects the screen Q of the stereoscopic display monitor 6. Similarly, left-eye image data Pic_L (x, y) of the planar map are expressed by a set of points pl (xl, yl, Z0) at each of which a straight line (vector Vl) which connects between the point p (x, y, z) on the virtual map display surface P or the point p (x, y, z-dz) on the display surface R and the point O1 (xl, yl, 0) which is the position of the left eye intersects the screen Q of the stereoscopic display monitor 6. On the other hand, each of the icons of the enter button and the return button in the right-eye image of the planar map is expressed by a set of points pr on the right-eye image, while each of the icons of the enter button and the return button in the left-eye image of the planar map is expressed by a set of points pl on the left-eye image.

The screen composition processing unit, 4 calculates the points pr and pl in such a way that the distance between the virtual map display surface P and the position of the driver's eyes is equal to z and the distance between the display surface R of the icons and the position of the driver's eyes is equal to (z-dz) by using the planar map data Pi_plane, the parameters Z0, d, and z, and the icon data to generate right-eye image data Pic_R(x, y) and left-eye image data Pic_L (x, y), and outputs the right-eye image data Pic_R (x, y) and the left-eye image data Pic_L(x, y) to a video image playback device 5.

The video image playback device 5 plays back the right-eye image data Pic_R(x, y) and the left-eye image data Pic_L (x, y) which are generated by the screen composition processing unit 4, and outputs them to the stereoscopic display monitor 6. The stereoscopic display monitor 6 displays the planar map and the icons in a stereoscopic manner by using the right-eye image and the left-eye image which are played back by the video image playback device 5. At this time, the 3Dimension stereoscopic display device makes the icon image look as if it is floating the distance dz on the planar image with respect to the driver's position by using stereoscopic vision.

When "contact" of a pointing object, such as the user's finger, with the touch surface is detected by the touch panel 22 in the above-mentioned display state, the screen composition processing unit 4 increases the distance dz in such a way that (z-dz) becomes equal to Z0, generates right-eye image data Pic_R(x, y) and left-eye image data Pic_L(x, y), and outputs these image data to the video image playback device 5.

The video image playback device 5 plays back the right-eye image data Pic_R(x, y) and the left-eye image data. Pic_L (x, y) which are generated by the screen composition processing unit 4, and outputs them to the stereoscopic display monitor 6. The stereoscopic display monitor 6 displays the planar map and the icons in a stereoscopic manner by using the right-eye image and the left-eye image which are played back by the video image playback device 5. As a result, the 3Dimension stereoscopic display device displays each of the icon images by using stereoscopic vision in such a way that each of the icon images is focused onto the screen Q of the stereoscopic display monitor 6 with respect to the driver's position.

Figure 14:
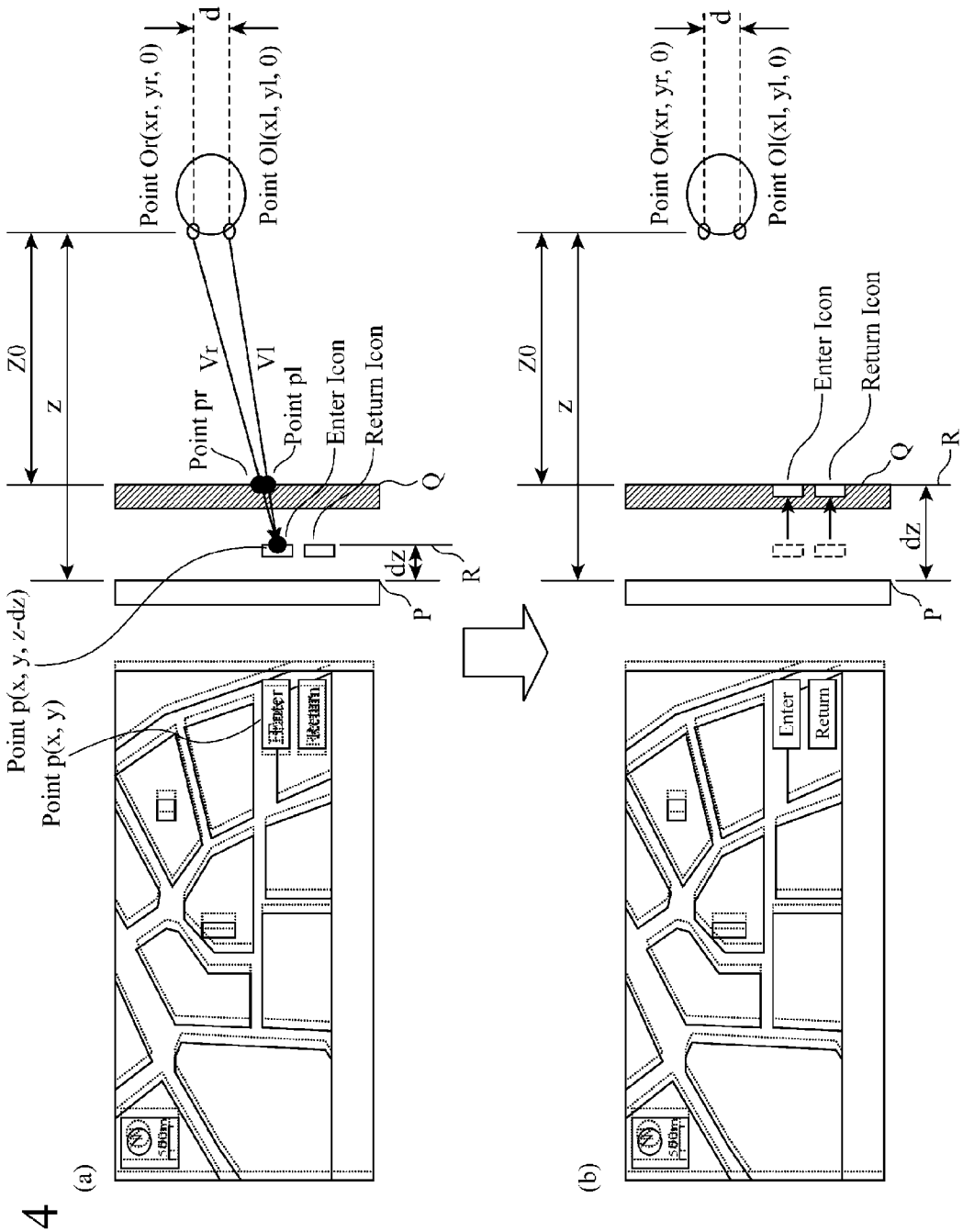
FIG. 14 is a view showing an outline of the screen compositing process carried out by the 3Dimension stereoscopic display device in accordance with Embodiment 2.

FIG. 14 is a view showing an outline of the screen compositing process carried out by the 3Dimension stereoscopic display device in accordance with Embodiment 2. First, the 3Dimension stereoscopic display device displays the planar map on the virtual map display surface P placed at a position backward with respect to the screen Q of the stereoscopic display monitor 6, and displays the enter button and the return button on the virtual display surface R placed at a position forward with respect to the virtual map display surface P of the planar map, as shown in FIG. 14(a). At this time, the 3Dimension stereoscopic display device displays the planar map in such a way that the planar map is focused to a position which is the farthest from the user, and also displays the enter button and the return button by using stereoscopic vision in such a way that each of these buttons is focused to a position closer to the user by the distance dz from the planar map, as shown in a left part of FIG. 14(a).

When "contact" of a pointing object, such as the user's finger, with the touch surface is detected by the touch panel 22, the screen composition processing unit increases the distance dz up to (z-Z0), as shown in FIG. 14(b). As a result, the 3Dimension stereoscopic display device displays the enter button and the return button by using stereoscopic vision in such a way that they are focused onto the screen Q of the stereoscopic display monitor 6 with respect to the user's position while making the planar map remain displayed, as shown in the left part of FIG. 14(b). After that, when the user pushes the enter button or the return button via the touch surface by using a pointing object, a function according to the enter button or the return button is carried out.

Because the enter button and the return button are displayed in such a way as to be focused onto the screen Q of the stereoscopic display monitor 6 when a pointing object is brought in contact with the touch surface, the visibility of the icons each of which is an operation target is improved. Further, by displaying the icons in such a way that each of them is focused to a position farther away from the user than the screen Q of the stereoscopic display monitor 6 before the user touches the touch surface, the 3Dimension stereoscopic display device enables the user looking at a distant area to direct his or her line of sight towards the screen Q with a shorter travel distance of its focus position and easily view the image on the screen.

When contact with the touch surface is detected, instead of increasing the distance dz up to (z-Z0), the 3Dimension stereoscopic display device can gradually move the display surface R of the icon images closer to the screen Q of the stereoscopic display monitor 6 to make the display surface R coincide with the screen Q of the stereoscopic display monitor 6 by gradually bringing the distance dz close to (z-Z0) in steps of a predetermined value. In contrast with this, when returning to the display state shown in FIG. 11(a) after the user has operated the system, the 3Dimension stereoscopic display device can return the distance dz to its original value gradually in steps of a predetermined value.

Further, although the case in which the enter button and the return button are displayed in such a way as to be focused to a position closer to the user by the distance dz than the planar map in the normal state before the user operates the system is shown in FIGS. 12 and 14(a), the 3Dimension stereoscopic display device can set dz to zero in such a way that the buttons are focused onto the planar map. In this case, when contact with the touch surface is detected, the 3Dimension stereoscopic display device can make the virtual, map display surface P coincide with the screen Q of the stereoscopic display monitor 6. Even when doing in this way, the 3Dimension stereoscopic display device can provide the same advantage as that mentioned above.

In addition, the 3Dimension stereoscopic display device can control an icon associated with a function which the user is not permitted to perform according to the state of the vehicle equipped with or holding the device in such a way that the focus position of the icon based on stereoscopic vision is not changed even when detecting the user operation. For example, as the icon associated with a function which the user is not permitted to perform according to the above-mentioned state of the vehicle, there is provided an icon which does not accept the operation assigned to the icon due to restrictions which are imposed on operations at a time when the vehicle is travelling. In this case, the 3Dimension stereoscopic display device can change the color and shape of the icon to a color and a shape different from those of any function which the user is permitted to perform even when driving the vehicle, or can send out a warning sound or a warning message when the user operates the icon.

Figure 15:
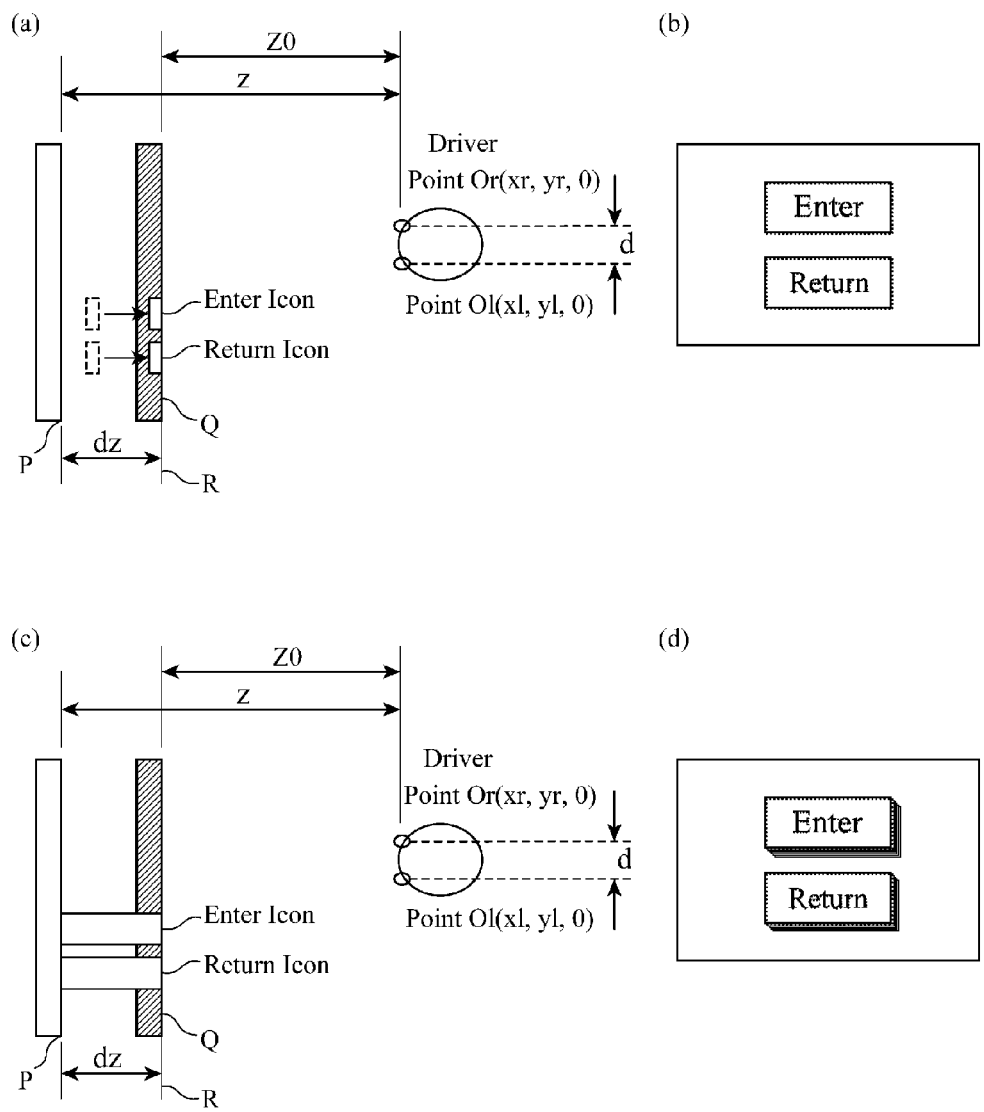
FIG. 15 is a view showing a display example of icons when an operation is detected.

Although the case in which the virtual display surface R of the icon images is moved to coincide with the screen Q of the stereoscopic display monitor 6 when an operation is detected is shown, the present invention is not limited to this case. FIG. 15 is a view showing a display example of the icons when an operation is detected. FIGS. 15(a) and 15(b) show cases in which the display surface R of the icon image is made to coincide with the screen. Q of the stereoscopic display monitor 6 when an operation is detected, like in the above-mentioned case. In this case, while the 3Dimension stereoscopic display device displays the icons of the enter button and the return button by using stereoscopic vision in such a way that they are focused onto the screen. Q of the stereoscopic display monitor 6 with respect to the user's position, the 3Dimension stereoscopic display device makes the icons look as if they are floating on the planar map, as shown in FIG. 15(b). As an alternative, the 3Dimension stereoscopic display device can display the icons in such a way that they are extending from the virtual map display surface P of the planar map to the screen Q of the stereoscopic display monitor 6, as shown in FIGS. 15(c) and 15(d) By displaying the icons in this way, the 3Dimension stereoscopic display device can improve the visibility of the icons. In the case shown in FIGS. 15(a) and 15(b), when displaying the icons in such a way that they are floating on the screen of the stereoscopic display monitor 6 when an operation is detected, the 3Dimension stereoscopic display device can change the shapes of the icons to display the icons. By changing the shapes of the icons between before an operation is performed and at a time when an operation is being performed, the 3Dimension stereoscopic display device can improve the visibility of the icons at a time when an operation is being performed.

As mentioned above, the 3Dimension stereoscopic display device in accordance with this Embodiment 2 includes: the touch panel 22 for accepting a user operation, the video image playback device 5 for playing back a right-eye image and a left-eye image for three-dimensional stereoscopic display of an inputted image which is a display object; the stereoscopic display monitor 6 for producing a three-dimensional stereoscopic display of the right-eye image and the left-eye image for three-dimensional stereoscopic display of the image which is the display object, the right-eye and left-eye images being played back by the video image playback device 5; and the screen composition processing unit for, when producing a three-dimensional stereoscopic display of both an icon image for user operation and a base image for display of the icon image as the image which is the display object, generating the right-eye image or video image and the left-eye image or video image for three-dimensional stereoscopic display in which a virtual display surface R for three-dimensional stereoscopic display of the icon image for user operation, a virtual display surface P for three-dimensional stereoscopic display of the base image, and the screen Q of the stereoscopic display monitor 6 differ from one another, and generating the right-eye image or video image and the left-eye image or video image for three-dimensional stereoscopic display in which the virtual display surface R for three-dimensional stereoscopic display of the icon image is moved with respect to the virtual display surface P for three-dimensional stereoscopic display of the base image or the screen Q of the stereoscopic display monitor 6 according to a user operation on the icon image for user operation using the touch panel 22 to output the right-eye image or video image and the left-eye image or video image generated thereby to the video image playback device 5. Because the 3Dimension stereoscopic display device can improve the visibility of the icon image for user operation by doing in this way, the 3Dimension stereoscopic display device can provide an HMI with a three-dimensional stereoscopic display which enables the user to perform an operation matching the user's intuition.

Although in above-mentioned Embodiment 2 the case in which the touch panel 22 detects "contact" of a pointing object with the touch surface thereof and a "push" on the touch surface thereof, the present invention is not limited to this case. For example, by using a non-contact capacitance type three-dimensional touch panel that can detect the distance between a pointing object to the touch surface thereof and contact of the pointing object with the touch surface thereof, the 3Dimension stereoscopic display device can gradually move the display surface P of the icons from a display state as shown in FIG. 14(a) according to the distance between the pointing object and the touch surface, and can control the screen composition processing unit to provide a display state as shown in FIG. 14(b) to perform the function associated with an icon selected when the pointing object comes in contact with the touch surface.

Although in above-mentioned Embodiments 1 and 2 the case in which icons are displayed in a stereoscopic manner is shown, a route guidance screen can be displayed in a stereoscopic manner according to an operation for navigation processing. For example, the 3Dimension stereoscopic display device places a virtual display of a planar map at a position farther away from the driver than the screen of the stereoscopic display monitor 6, while displaying a route guidance screen at a position forward with respect to the virtual display surface of the planar map.

The 3Dimension stereoscopic display device in accordance with above-mentioned Embodiment 2 can further display the vehicle position, a route, a guidance point, a cursor, a three-dimensional agent display, and an event, such as other traffic information, in such a way that they are floating forward with respect to the virtual, map display surface of the planar map according to a user operation. In addition, the 3Dimension stereoscopic display device can display significant characters showing information, such as a destination, in a stereoscopic manner. For example, the 3Dimension stereoscopic display device displays a schematic illustration of highways and POIs in a stereoscopic manner.

Further, when the user performs an operation of specifying a POI displayed on the planar map, the 3Dimension stereoscopic display device can display a balloon in which the information on this specified POI is described by using stereoscopic vision in such a way that the balloon is floating forward with respect to the virtual map display surface of the planar map when viewed from the driver's position.

Further, although the case in which a planar map is displayed in a stereoscopic manner is shown in above-mentioned Embodiments 1 and 2, the present invention can also be applied to a display of information, such as a menu screen for an AV system, vehicle information, and safety information, as long as the information is typical information displayed on the in-vehicle information system. For example, the present invention can be used for a display of an icon for control of an air conditioner, a meter panel, in the dashboard, information about the fuel efficiency of the vehicle, preventive safety information, VICS (registered trademark) information, or the like.

In addition, although the case in which a stereoscopic display which is viewed stereoscopically with the naked eye is produced is shown in above-mentioned Embodiments 1 and 2, the present invention can also use a stereoscopic display method of providing a stereoscopic image by using a polarization eyeglass.

Although the case in which the 3Dimension stereoscopic display device in accordance with the present invention is applied to an in-vehicle information system is shown in above-mentioned Embodiments 1 and 2, the 3Dimension stereoscopic display device in accordance with the present invention can be applied to any display device having such a stereoscopic display monitor as above mentioned. For example, the 3Dimension stereoscopic display device in accordance with the present invention can be applied to not only an in-vehicle navigation device, but also a display device for use in a mobile telephone terminal or a mobile information terminal (PDA; Personal Digital Assistance). Further, the 3Dimension stereoscopic display device in accordance with the present invention can be applied to a display device, such as a PND (Portable Navigation Device) which a person carries onto a moving object, such as a car, a railroad, a ship, or an airplane, to use it.

While the invention has been described in its preferred embodiments, it is to be understood that an arbitrary combination of two or more of the above-mentioned embodiments can be made, various changes can be made in an arbitrary component in accordance with any one of the above-mentioned embodiments, or an arbitrary component in accordance with any one of the above-mentioned embodiments can be omitted within the scope of the invention.

Industrial Applicability

Because the 3Dimension stereoscopic display device in accordance with the present invention can provide an HMI with a three-dimensional stereoscopic display which enables the user to perform an operation matching the user's intuition, the 3Dimension stereoscopic display device is suitable for use as a display device mounted in an in-vehicle information system.

The invention claimed is:

1. A 3Dimension stereoscopic display device comprising:
an operation input unit for accepting a user operation; a user operation detection unit for detecting a behavior of going to perform a user operation on said operation input unit;
a playback processing unit for playing back a right-eye image or video image and a left-eye image or video image for three-dimensional stereoscopic display of an inputted image or video image which is a display object;
a stereoscopic display monitor unit for producing a three-dimensional stereoscopic display of the right-eye image or video image and the left-eye image or video image for three-dimensional stereoscopic display of said image or video image which is the display object, the right-eye and left-eye images or video images being played back by said playback processing unit; and
- a screen composition processing unit for generating the right-eye image or video image and the left-eye image or video image for three-dimensional stereoscopic display in which a virtual display surface for three-dimensional stereoscopic display of said image or video image which is the display object is moved with respect to a screen of said stereoscopic display monitor unit according to whether a user operation using said operation input unit is being performed or whether said user operation detection unit detects the behavior to output said right-eye image or video image and said left-eye image or video image generated thereby to said playback processing unit, wherein when no user operation using said operation input unit is being performed, said 3Dimension stereoscopic display device moves the virtual display surface for three-dimensional stereoscopic display of said image or video image which is the display object backward with respect to the screen of said stereoscopic display monitor unit when viewed from a user's position, whereas when a user operation using said operation input unit is being performed or when said user operation detection unit detects a behavior of going to perform a user operation on said operation input unit, said screen composition processing unit moves said virtual display surface for three-dimensional stereoscopic display closer to a user, and, when said user operation is completed, moves said virtual display surface for three-dimensional stereoscopic display to its original position backward with respect to the screen of said stereoscopic display monitor unit.

2. The 3Dimension stereoscopic display device according to claim 1, wherein when said user operation detection unit detects a behavior of going to perform a user operation on said operation input unit, said screen composition processing unit moves said virtual display surface for three-dimensional stereoscopic display closer to the screen of said stereoscopic display monitor unit when viewed from the user's position.

3. The 3Dimension stereoscopic display device according to claim 1, wherein said image which is the display object is a planar image or a stereoscopic image displayed on a planar image.

4. The 3Dimension stereoscopic display device according to claim 1, wherein said user operation detection unit is included in said operation input unit and said operation input unit is a touch panel disposed on the screen of said stereoscopic display monitor unit, and when it is detected that a pointing object is in contact with a touch surface of said touch panel, said screen composition processing unit generates the right-eye image or video image and the left-eye image or video image for three-dimensional stereoscopic display which are displayed in such a way that the virtual display surface for three-dimensional stereoscopic display of said image or video image which is the display object is moved to a position close to or same as to that of the screen of said stereoscopic display monitor unit.

5. The 3Dimension stereoscopic display device according to claim 1, wherein said user operation detection unit is included in said operation input unit and said operation input unit is a touch panel disposed on the screen of said stereoscopic display monitor unit and capable of detecting whether a pointing object approaching reaches an area at a predetermined distance or less from a touch surface thereof, and when it is detected that said pointing object reaches the area at the predetermined distance or less from the touch surface of said touch panel, said screen composition processing unit generates the right-eye image or video image and the left-eye image or video image for three-dimensional stereoscopic display which are displayed in such a way that the virtual display surface for three-dimensional stereoscopic display of said image or video image which is the display object is moved to a position close to or same as to that of the screen of said stereoscopic display monitor unit.

6. The 3Dimension stereoscopic display device according to claim 1, wherein when a user operation using said operation input unit is being performed or when said user operation detection unit detects a behavior of going to perform a user operation on said operation input unit, said screen composition processing unit generates the right-eye image or video image and the left-eye image or video image for three-dimensional stereoscopic display which are displayed in which such a way that the virtual display surface for three-dimensional stereoscopic display of said image or video image which is the display object is gradually moved closer to a user when viewed from the user's position.

7. A 3Dimension stereoscopic display device comprising:
- an operation input unit for accepting a user operation;
- a user operation detection unit for detecting a behavior of going to perform a user operation on said operation input unit;
- a playback processing unit for playing back a right-eye image or video image and a left-eye image or video image for three-dimensional stereoscopic display of an inputted image or video image which is a display object;
- a stereoscopic display monitor unit for producing a three-dimensional stereoscopic display of the right-eye image or video image and the left-eye image or video image for three-dimensional stereoscopic display of said image or video image which is the display object, the right-eye and left-eye images or video images being played back by said playback processing unit; and
- a screen composition processing unit for, when producing a three-dimensional stereoscopic display of both an icon image for user operation and a base image for display of said icon image as said image which is the display object, generating the right-eye image or video image and the left-eye image or video image for three-dimensional stereoscopic display in which a virtual display surface for three-dimensional stereoscopic display of said icon image for user operation, a virtual display surface for three-dimensional stereoscopic display of said base image, and the screen of said stereoscopic display monitor unit differ from one another, and generating the right-eye image or video image and the left-eye image or video image for three-dimensional stereoscopic display in which the virtual display surface for three-dimensional stereoscopic display of said icon image is moved with respect to the virtual display surface for three-dimensional stereoscopic display of said base image or the screen of said stereoscopic display monitor unit according to whether a user operation on said icon image for user operation using said operation input unit is being performed or whether said user operation detection unit detects the behavior to output said right-eye image or video image and said left-eye image or video image generated thereby to said playback processing unit, wherein when no user operation using said operation input unit is being performed, said 3Dimension stereoscopic display device moves the virtual display surface for three-dimensional stereoscopic display of said icon image and the virtual display surface for three-dimensional stereoscopic display of said base image backward with respect to the screen of said stereoscopic display monitor unit when viewed from a user's position, whereas when a user operation using said operation input unit is being performed or when said user operation detection unit detects a behavior of going to perform a user operation on said operation input unit, said screen composition processing unit moves the virtual display surface for three-dimensional stereoscopic display of said icon image and the virtual display surface for three-dimensional stereoscopic display of said base image closer to a user, and, when said user operation is completed, moves the virtual display surface for three-dimensional stereoscopic display of said icon image and the virtual display surface for three-dimensional stereoscopic display of said base image to their original positions backward with respect to the screen of said stereoscopic display monitor unit.

8. The 3Dimension stereoscopic display device according to claim 7, when a user operation on said icon image for user operation using said operation input unit is being performed, said screen composition processing unit generates the right-eye image or video image and the left-eye image or video image for three-dimensional stereoscopic display which are displayed in such a way that the virtual display surface for three-dimensional stereoscopic display of said icon image is moved to a position close to or same as to that of the screen of said stereoscopic display monitor unit.

9. The 3Dimension stereoscopic display device according to claim 8, wherein when a user operation using said operation input unit is being performed or when said user operation detection unit detects a behavior of going to perform a user operation on said operation input unit, said screen composition processing unit generates the right-eye image or video image and the left-eye image or video image for three-dimensional stereoscopic display which are displayed in such a way that the virtual display surface for three-dimensional stereoscopic display of said icon image is gradually moved closer at a predetermined speed when viewed from a user's position.

10. The 3Dimension stereoscopic display device according to claim 7, wherein when a user operation on said icon image for user operation using said operation input unit is being performed, said screen composition processing unit generates the right-eye image or video image and the left-eye image or video image for three-dimensional stereoscopic display which are displayed in such a way that the virtual display surface for three-dimensional stereoscopic display of said icon image and the virtual display surface for three-dimensional stereoscopic display of said base image are moved to a position close to or same as to that of the screen of said stereoscopic display monitor unit.

11. The 3Dimension stereoscopic display device according to claim 7, wherein when said icon image for user operation is not permitted to be operated according to a state of a moving object equipped with or holding said device, said screen composition processing unit generates the right-eye image or video image and the left-eye image or video image for three-dimensional stereoscopic display in which the virtual display surface for three-dimensional stereoscopic display of said icon image is not moved even when a user operation on said icon image using the said operation input unit is being performed.

12. The 3Dimension stereoscopic display device according to claim 11, wherein said icon which is not permitted to be operated according to the state of the moving object equipped with or holding said device is an icon which does not accept an operation assigned thereto according to restrictions on operations at a time when said moving object is travelling.

\* \* \* \* \*